(12) United States Patent
Garfinkle et al.

(10) Patent No.: US 10,129,244 B2
(45) Date of Patent: Nov. 13, 2018

(54) SECURING COMPUTING RESOURCES

(71) Applicant: Princeton SciTech LLC, New York, NY (US)

(72) Inventors: Richard Garfinkle, Chicago, IL (US); Norton Garfinkle, New York, NY (US)

(73) Assignee: Princeton SciTech, LLC, New York, NY (US)

( * ) Notice: Subject to any disclaimer, the term of this patent is extended or adjusted under 35 U.S.C. 154(b) by 112 days.

(21) Appl. No.: 15/187,308

(22) Filed: Jun. 20, 2016

(65) Prior Publication Data

US 2017/0366532 A1    Dec. 21, 2017

(51) Int. Cl.
*H04L 29/06*    (2006.01)
*G06F 21/62*    (2013.01)

(52) U.S. Cl.
CPC ........ *H04L 63/083* (2013.01); *G06F 21/6218* (2013.01); *H04L 63/061* (2013.01)

(58) Field of Classification Search
CPC ... H04L 63/08; H04L 63/0823; H04L 63/083; H04L 63/061
USPC .......................................................... 713/171
See application file for complete search history.

(56) References Cited

U.S. PATENT DOCUMENTS

| | | | | |
|---|---|---|---|---|
| 4,325,120 A | * | 4/1982 | Colley | G06F 9/546 711/202 |
| 5,678,041 A | * | 10/1997 | Baker | G06F 21/604 |
| 6,023,765 A | * | 2/2000 | Kuhn | G06F 21/6218 713/166 |
| 6,904,526 B1 | * | 6/2005 | Hongwei | G06F 21/31 713/172 |
| RE41,546 E | | 8/2010 | Vainstein | |
| 8,640,200 B1 | * | 1/2014 | Roth | H04L 63/0807 709/225 |

(Continued)

FOREIGN PATENT DOCUMENTS

| WO | WO-2010085285 A1 | 7/2010 |
| WO | WO-2015185888 A1 | 12/2015 |

OTHER PUBLICATIONS

Basin, David, Jürgen Doser, and Torsten Lodderstedt. "Model driven security: From UML models to access control infrastructures." ACM Transactions on Software Engineering and Methodology (TOSEM) 15.1 (2006): 39-91.*

(Continued)

*Primary Examiner* — Syed A Zaidi
(74) *Attorney, Agent, or Firm* — Schwegman Lundberg & Woessner, P.A.

(57) ABSTRACT

Various examples are directed to systems and methods for providing access to computing resources. A resource system may receive an access request from a first user. The access request may comprise resource data describing a computing resource and function data describing a requested function to be performed on the computing resource. The resource system may determine that credential data provided by the first user is valid. The resource system may identify secondary data for the access request and generate an access object based at least in part on access object fragment data and the secondary data. The resource system may execute the access object to enable performance of the requested function on the computing resource.

21 Claims, 11 Drawing Sheets

(56) References Cited

U.S. PATENT DOCUMENTS

| | | | | |
|---|---|---|---|---|
| 8,650,622 | B2* | 2/2014 | Murakami | H04W 12/08 |
| | | | | 705/26.1 |
| 8,656,037 | B2* | 2/2014 | Itoh | H04L 67/02 |
| | | | | 380/282 |
| 9,038,152 | B1* | 5/2015 | Vazquez | H04L 63/08 |
| | | | | 726/10 |
| 2002/0143766 | A1* | 10/2002 | Rajasekaran | G06F 21/6218 |
| 2003/0212887 | A1* | 11/2003 | Walther | H04L 63/08 |
| | | | | 713/151 |
| 2004/0032624 | A1* | 2/2004 | Stevens | H04N 1/00957 |
| | | | | 358/402 |
| 2007/0150807 | A1* | 6/2007 | Harrington | G06F 17/30011 |
| | | | | 715/234 |
| 2008/0263045 | A1 | 10/2008 | Soto et al. | |
| 2009/0113522 | A1* | 4/2009 | Crassous | H04L 9/3271 |
| | | | | 726/4 |
| 2010/0083285 | A1 | 4/2010 | Bahat et al. | |
| 2012/0166803 | A1* | 6/2012 | Hu | H04L 63/10 |
| | | | | 713/171 |
| 2014/0041010 | A1* | 2/2014 | Udupa | H04L 63/0272 |
| | | | | 726/10 |
| 2014/0136483 | A1* | 5/2014 | Chaudhary | G06F 17/30619 |
| | | | | 707/639 |
| 2014/0283119 | A1 | 9/2014 | Sandri et al. | |
| 2015/0052587 | A1 | 2/2015 | O'Neill et al. | |
| 2015/0271179 | A1 | 9/2015 | Wang et al. | |

OTHER PUBLICATIONS

"European Application Serial No. 17176936.7, Extended European Search Report dated Mar. 22, 2018", 7 pgs.

\* cited by examiner

US 10,129,244 B2

SECURING COMPUTING RESOURCES

TECHNICAL FIELD

Examples described herein generally relate to systems and methods for controlling access to computing resources.

BACKGROUND

Securing computing resources, such as data, hardware, etc., involves ensuring that specific computing resources are accessible only to properly authorized users and that those users can only perform authorized operations on those computing resources.

Many existing systems for securing computing resources operate by restricting user privileges. For example, an administrative user may limit the software and hardware capabilities of a computing system that are available to any given user. For example, in many Unix systems, an administrative user can specify which users have the privilege to read a file, change the file, or execute the file. Only authorized users may access the Unix functions to read, write, and execute the file, commonly called read, write, and execute privileges.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Figure 1:
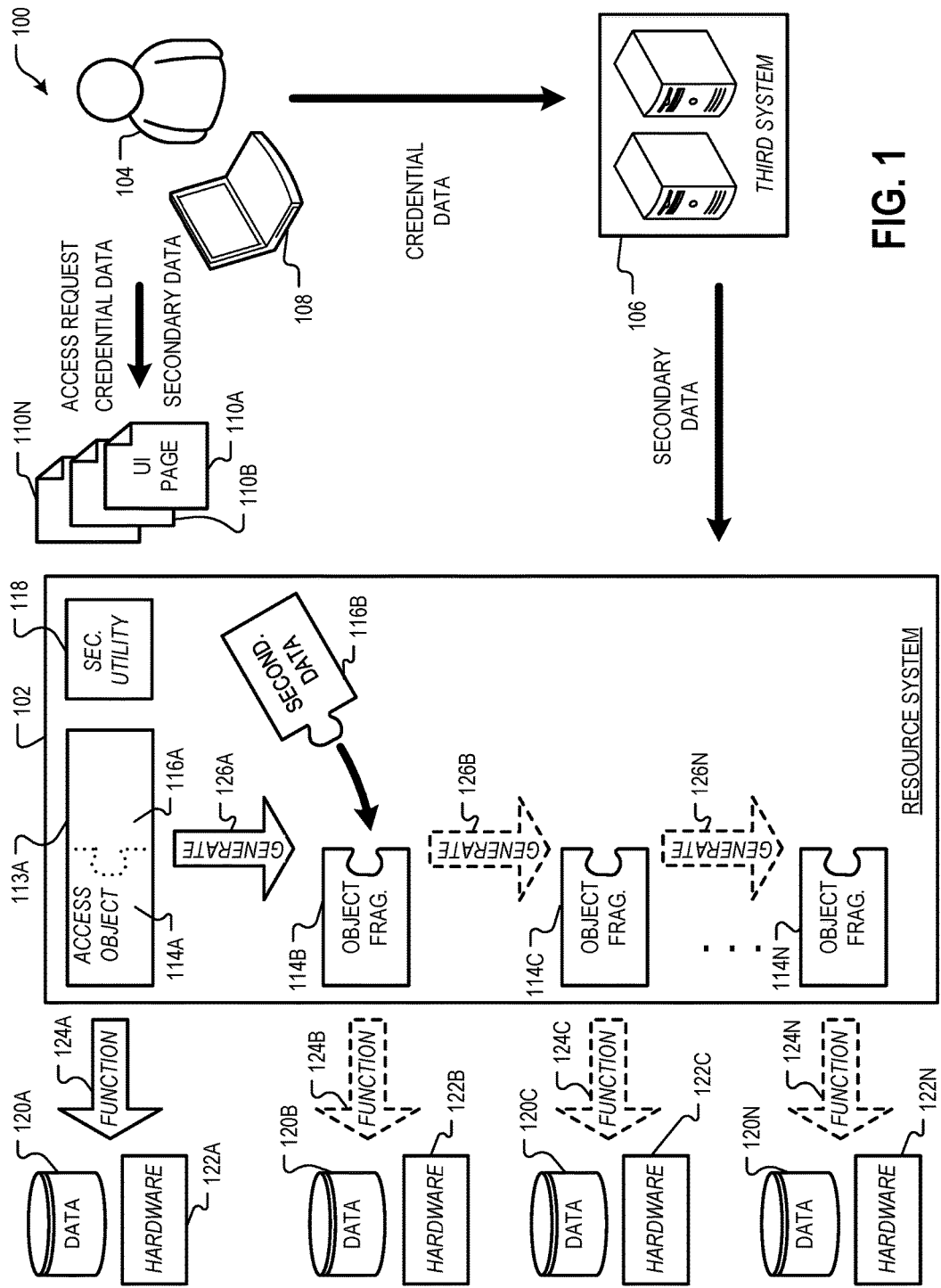
FIG. 1 is a diagram showing one example of an environment for controlling access to computer resources.

In the following description, for purposes of explanation, numerous specific details are set forth in order to provide a thorough understanding of some examples. It will be evident, however, to one skilled in the art that the present disclosure may be practiced without these specific details.

Various examples described herein are directed to systems and methods for securing computing resources. A resource system manages access to the computing resources by generating (or not generating) access objects. An access object may be a software object that provides functionality to perform a function on a computing resource. For example, when the computing resource is a data file or other unit of data, an access object may enable the user to view the file, read the file, write to the file, copy the file, etc. In another example where the computing resource is a hardware component, such as a camera, an access object may enable the user to perform an action with the hardware component (e.g., convert pixel values captured by the camera to an image or video). For example, the access object may be a driver for the hardware resource. Different access objects may provide the user with access to different computing resources and different functions to be performed on the computer resources.

Access objects may be created by the resource system upon authenticating a user and determining that the user is entitled to perform the function on the computing resource facilitated by the access object. In some examples, an access object may be generated from an object fragment and secondary data. The object fragment may be an incomplete copy of the access object, which may be stored at the resource system or received from another system, as described herein. The secondary data may be data combinable with the object fragment to form the access object. In some examples, an object fragment may include source code or object code that includes one or more placeholder strings. The resource system may create an access object by replacing placeholder strings in the object fragment with replacement strings.

Performing a function on a computing resource may include, for example, reading a computing resource, writing to a computing resource, moving a computing resource, etc. The resource system may be programmed to generate access objects as-needed and to discard access objects after use. For example, access objects may be maintained in Random Access Memory (RAM) or other volatile data storage locations. This may provide security benefits. For example, even if a hacker or other unauthorized user is able to breach the resource system, they may not be able to access the computing resources without also generating a specific access object for a specific computing resource and specific function.

In some examples, access objects, as described herein, are utilized to create tiered access to computing resources. For example, a user may provide first credential data to perform a requested function on a first computing resource. Provided that the first credential data is validated, the resource system generates a first level access object that performs the requested function on the first computing resource. The first level access object may also be programmed to generate a second level access object, for example, upon a request from the user to perform a second requested function and the provision of second credential data by the user. The second requested function may be performed on the first computing resource or on another computing resource. In some examples, the second access object may be programmed to generate a third level access object in a similar way, and so on.

FIG. 1 is a diagram showing one example of an environment 100 for controlling access to computer resources. The environment 100 includes a resource system 102 and a user 104. The resource system 102 may include any suitable computing device, for example, as described herein. In some examples, the resource system 102 may execute a security utility 118 for generating access objects, as described herein.

The user 104 may be any suitable user of the resource system 102. In some examples, the user 104 may access the resource system 102 directly, for example, via a keyboard, display, or any other suitable input/output (I/O) device of the resource system 102. In other examples, the user 104 may access the resource system 102 via a user computing device 108. The user computing device 108 may be or include any suitable computing device including, for example, a tablet computer, a laptop computer, a desktop computer, a smartphone, etc.

The user 104 may send an access request requesting to perform a function 124A, 124B, 124C, 124N on one or more computing resources, such as data resources 120A, 120B, 120C, 120N and/or hardware resources 122A, 122B, 122C, 122N. Computing resources 120A, 120B, 120C, 120N, 122A, 122B, 122C, 122N, may include any suitable resources that may be managed by a computer system, such as the resource system 102. For example, data resources 120A, 120B, 120C, 120N may include files of a file system, directories or directory structures of a file system, databases, database tables, database records, etc. Hardware resources 122A, 122B, 122C may include any suitable computing device including, for example, a laptop computer, a desktop computer, a tablet computer, a smart phone, a camera, a robot, an autonomous vehicle such as a car or truck, etc. In some examples, computing resources 120A, 120B, 120C, 120N, 122A, 122B, 122C, 122N are stored at a data store of the resource system 102, may be in communication with the resource system 102 and/or may be stored at a computing system in communication with the resource system.

Functions 124A, 124B, 124C, 124N may include any suitable function that may be performed on a computing resource such as, for example, reading the computing resource, writing to the computing resource, copying the computing resource, moving the computing resource, executing the computing resource, operating the computing resource, etc.

Initially, the user 104 may send the access request requesting that the function 124A be performed on the data resource 120A and/or the hardware resource 122A. The request may include function data describing the requested function and resource data describing the data resource (e.g., 120A, 122A) to be the object of the function. In some examples, the access request also includes credential data describing the user, such as, for example, a username, a password, a digital certificate, multi-factor authentication, etc. The resource system 102 (e.g., the security utility 118) may receive the request and validate the credential data to verify the identity of the user. Validating the credential data may include, for example, comparing the credential data to reference data for the user 104 stored at the resource system 102, or in any other suitable manner Upon validating the user, the resource system 102 (e.g., the security utility 118) may generate an access object 113A, for example, by combining an object fragment 114A with secondary data 116A. The secondary data 116A may be obtained from the user 104, from the user computing device 108, and/or from a third computing system 106. In some examples, the secondary data 116A may be included with the access request, for example, as all or part of the credential data, as data distinct from the credential data, etc. In some examples, the user 104 provides credential data to the third system 106 which may, in turn, provide secondary data 116A to the resource system 102. In some examples, the resource system 102 may scan the user computing device 108 to identify secondary data 116A stored at the user computing device.

The secondary data 116A may include replacement code (e.g., one or more replacement strings) combinable with the object fragment 114A to generate the access object 113A. The object fragment 114A may be source code or object code. The resource system 102 may combine the object fragment 114A with the secondary data 116A (e.g., replacement code thereof) to generate complete code for implementing the access object 113A. The resource system 102 may execute the complete code to implement the access object 113A. The complete code may be object code and/or source code. When the complete code for the access object 113A is source code, the resource system (or other suitable system) may compile and/or interpret the complete code prior to execution to generate object code for the access object 113A. Additional examples showing how an object fragment, such as 114A, may be combined with secondary data, such as 116A to generate an access object 113A are disclosed herein.

When generated, the access object 113A may provide the user 104 with functionality to perform the function 124A on one or more of computing resources 120A, 122A. Although one function 124A is shown, in some examples, the access object 113A may enable the user to 104 to perform multiple functions with respect to a single computing resource or a set of computing resources.

In some examples, the access object 113A may also be programmed to generate 126A a second level access object 113B from an object fragment 114B and secondary data 116B. For example, the resource system 102 may receive second level credential data form the user 104. If the second level credential data is validated, the resource system 102 (e.g., the access object 113A) may identify secondary data 116B and combine the secondary data 116B with an object fragment 114B to form the second level access object 113B. The second level object fragment 113B may provide the user 104 with one or more functions 124B capable of being performed on computing resources 120B, 122B. Computing resources 120B, 122B are shown as distinct from computing resources 120A, 122A, however, in some examples, the second level access object 113B may provide additional functions to be performed on some or all of the computing resources 120A, 122A accessible through the access object 113A. For example, the access object 113A may enable the user 104 to view or read a file while the second level access object 113B may enable the user 104 to write or copy the file.

Any suitable number of tiered access objects may be generated. For example, the access object 113B may be enabled to generate 126B a third level access object from an object fragment 114C and third secondary data. The third level access object may enable function(s) 124C to computing resources 120C, 122C and may also generate a next level access object (e.g., fourth level). FIG. 1 also shows an Nth level object fragment 114N that may be combined with Nth secondary data to generate 126N an Nth level access object. The Nth level object fragment 114N may enable to the user 104 to perform function(s) 124N to computing resources 120N, 122N.

In some examples, the resource system (e.g., the access objects 113A, 113B, etc.) may provide one or more UI pages 110A, 110B, 110N to the user 104. The UI pages 110A, 110B, 110N may be displayed, for example, by a display of the resource system 102 and/or by a display of the user computing device 108. The access object 113A may be, include and/or generate the UI page 110A. The UI page 110A may include a web page written in Hypertext Markup Language (HTTP) or any other suitable syntax. UI page 110A may include links allowing the user to access combinations of functions 124A and computing resources 120A, 122A accessible through the access object 113A. UI page 110A may also include a field for receiving additional (e.g., second level) credential information. Additional access objects 113B, etc., may generate additional UI pages 110B, 110N.

Figure 2:
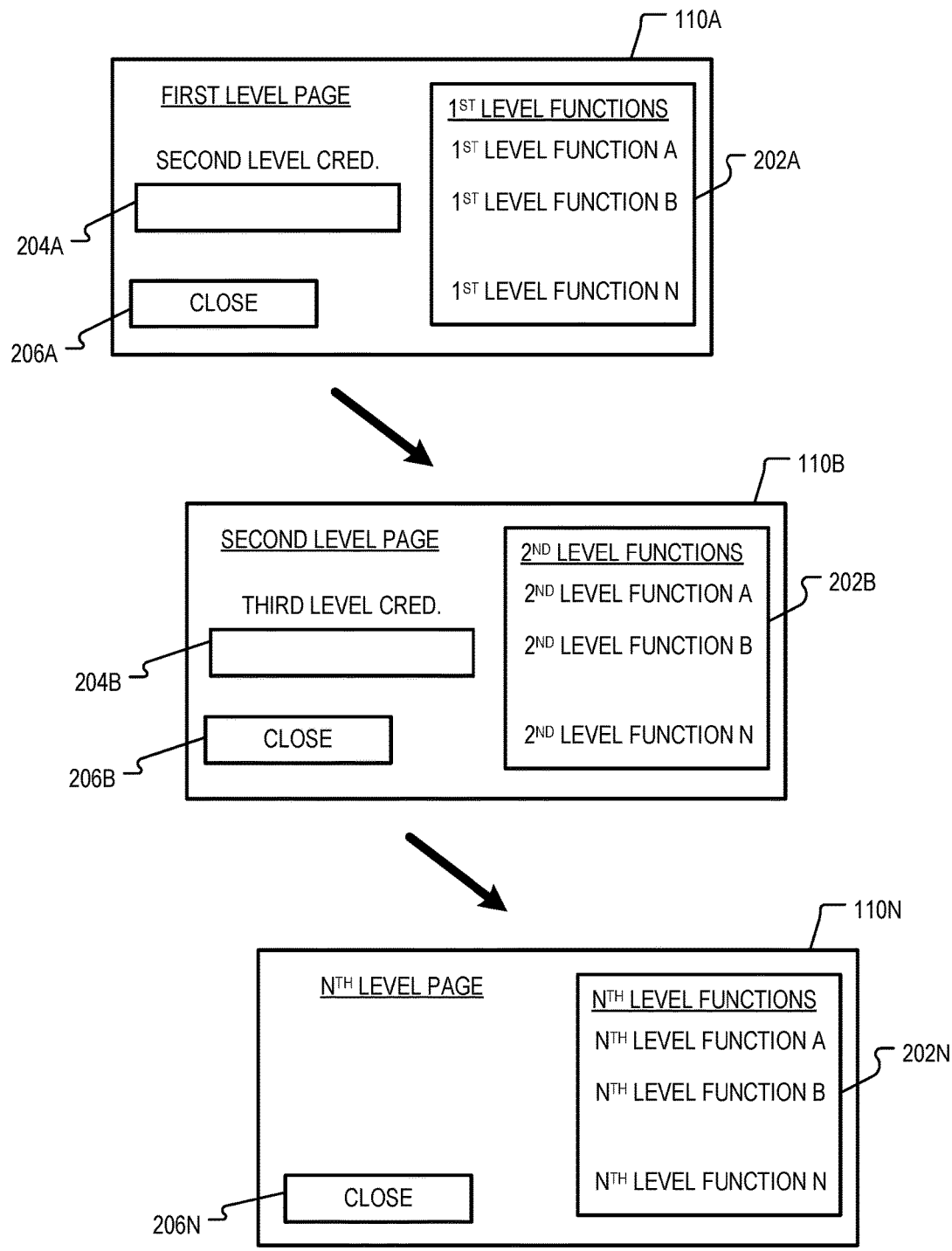
FIG. 2 is a diagram showing additional details of example user interface (UI) pages of FIG. 1.

FIG. 2 is a diagram showing additional details of example user interface (UI) pages 110A, 110B, 110N. For example, UI page 110A includes a function field 202A showing one or more of the functions 124A provided to the user 104 by the access object 113A. The function field 202A may include hyperlinks or other selectable indications that, when selected by the user, launch the indicated function 124A. In some examples, each hyperlink in the function field 202A may correspond to a particular combination of a function and a computing resource 120A, 122A to which the function will be applied. In some examples, the function field 202A may include a list of computing resources 120A, 122A in addition to or instead of functions. For example, when the user 104 selects a hyperlink corresponding to a computing resource, the user 104 may be prompted to select an available function to perform on the computing resource.

UI page 110A also includes a second level credential field 204A. In some examples, the user 104 selects the second level credential field 204A and provides second level credential data via the field 204A. The access object 113A may utilize the second level credential data, as described herein to generate the second level access object 113B. The UI page 110A also includes a close button 206A. The close button 206A may be selectable by the user 104 to terminate the access object 113A. For example, upon selection of the close button 206A by the user 104, the resource system 102 may purge the access object 113A from volatile memory. FIG. 2 also shows the second level UI page 110B which may include a second level function field 202B including hyperlinks that may be selectable to perform functions 124B on resources 120B, 122B. A close button 206B may also be included. A third level credential field 204B may receive third credential data for generating a third level access object. The Nth level UI page 110N includes an Nth level function field 202N and close button 206N.

Figure 3:
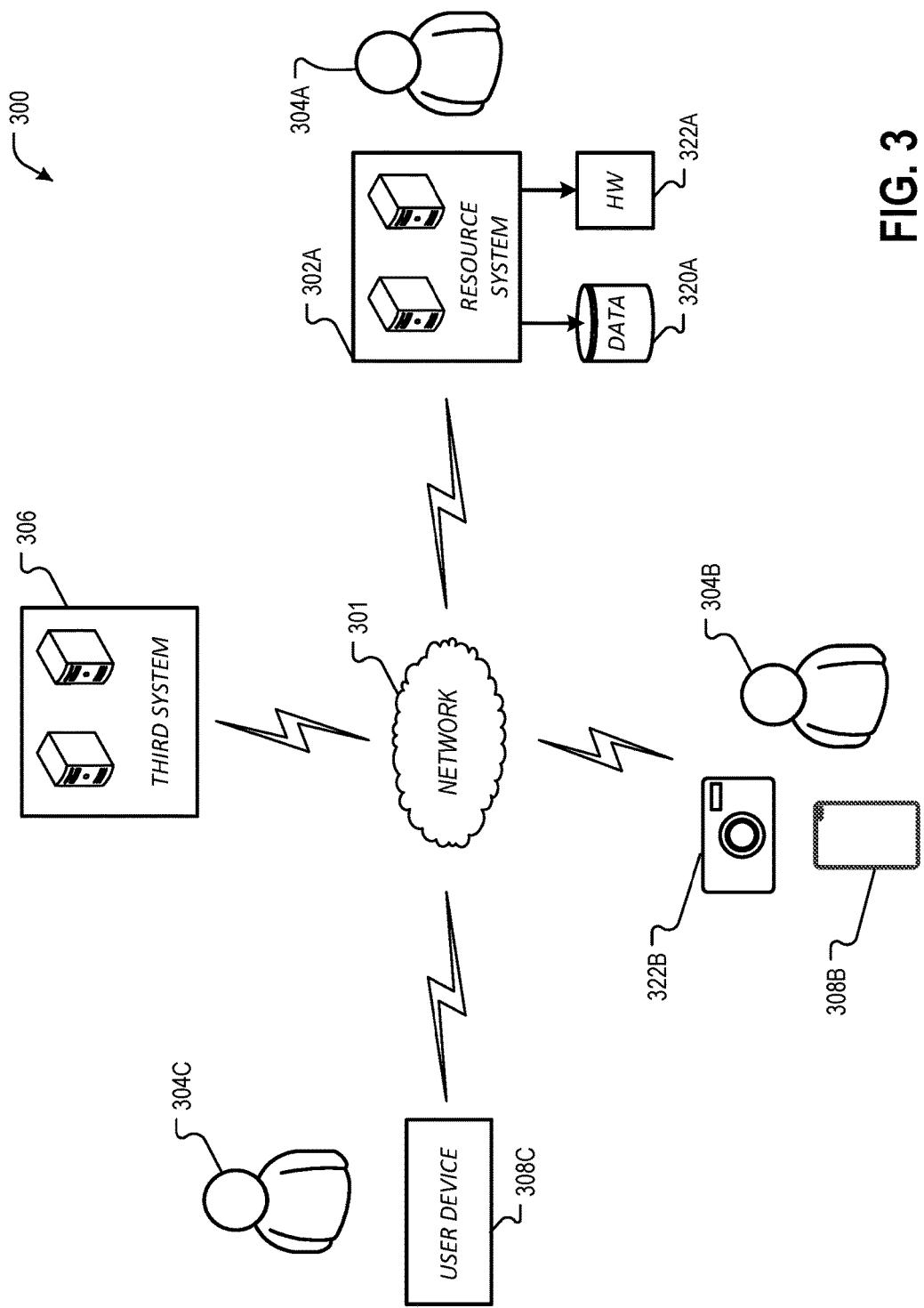
FIG. 3 is a diagram showing one example of a network environment 300 for controlling access to computer resources.

FIG. 3 is a diagram showing one example of a network environment 300 for controlling access to computer resources. A resource system 302A is shown including and/or managing data resources 320A and hardware computing resources 322A. A user 304A may access the resources 320A, 322A directly via a display, keyboard, and/or other I/O component of the resource system 302A. Also, a user 304C is shown accessing the resource system 302A via a network 301 and user computing device 308C (e.g., similar to the user computing device 108 of FIG. 1). An example third system 306 is also shown.

FIG. 3 also shows a user 304B utilizing a user computing device 308B to access a hardware computing resource (e.g., a camera 322B). For example, the functionality of the resource system 102 described above may be executed by the user computing device 308B and/or the camera 322B. In some examples, one or more of the camera 322B and user computing device 308B may be in communication with the resource system 302A via the network. For example, the camera 322B may access a configuration profile, photographs, and/or other data or hardware of the resources 320A, 322A.

The various components of the environment 300 may be in communication with one another via a network 301. The network 301 may be or comprise any suitable network element operated according to any suitable network protocol. For example, one or more portions of network 301 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 4:
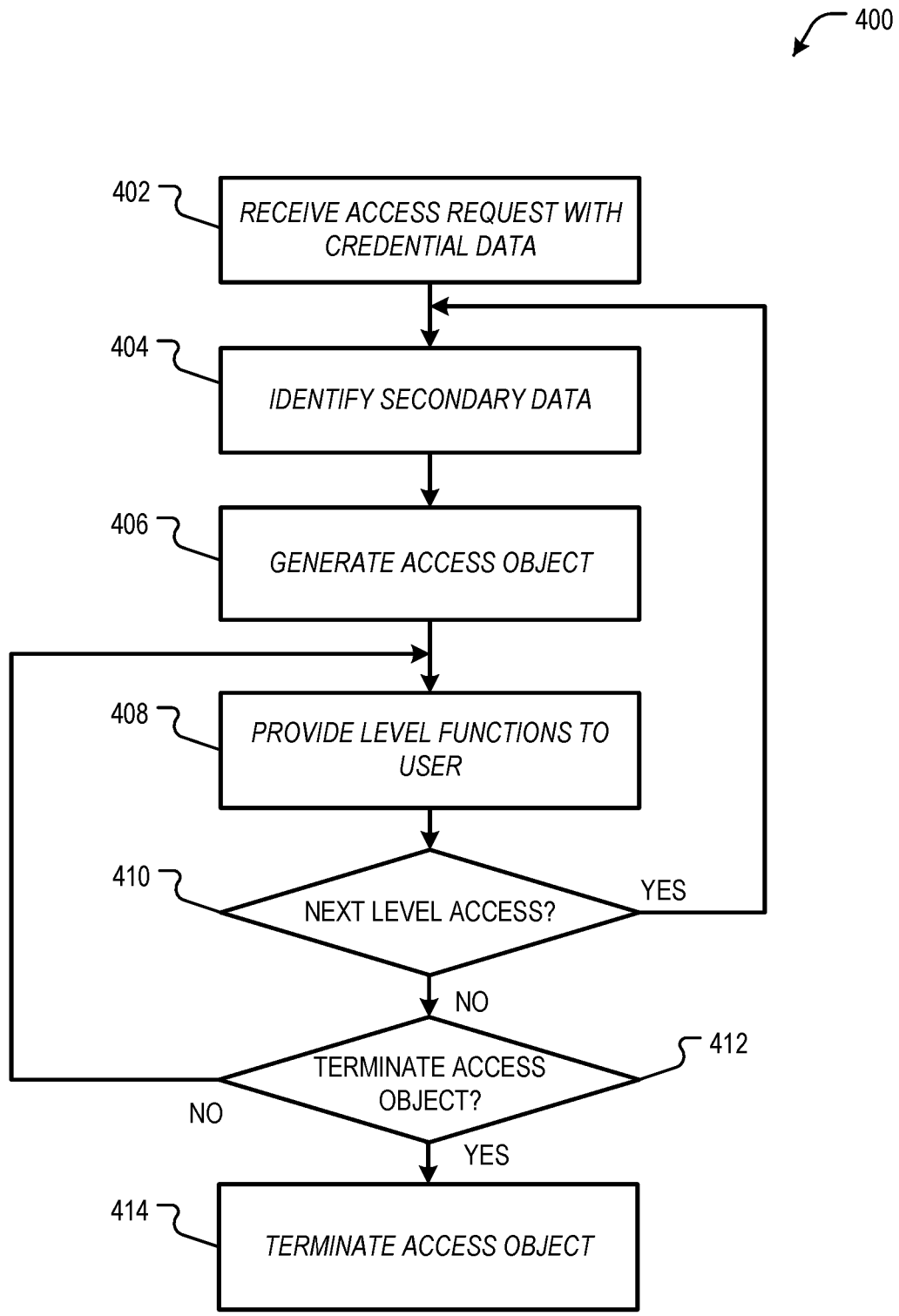
FIG. 4 is a flowchart showing one example of a process flow for generating an access object.

FIG. 4 is a flowchart showing one example of a process flow 400 for generating an access object, such as access object 113A of FIG. 1. The process flow 400 may be executed by a resource system, such as the resource system 102. In some examples, some or all of the process flow 400 may be executed by an access object, for example to generate a next level access object.

At action 402, the resource system may receive a computing resource access request with credential data. The access request may include data describing the type of access being requested including, for example, a function or functions and/or a description of computing resources to be accessed. Credential data may be of any suitable form. In some examples, credential data includes a user name, password, personal identification number (PIN), etc. Also, in some examples, credential data may include a digital certificate signed by a third party certificate authority. In some examples, the credential data may utilize multi-factor authentication. For example, the resource system may store a cell phone number, e-mail address, or other alternate contact mechanism for the user. Upon receiving a request for resource access, the resource system may send a password to the user's alternate contact mechanism. The credential data, then, may include the password provided to the user's alternate contact mechanism. In some examples, the type of credential data provided may depend on the level of access being requested. For example, to generate a first level access object, the user may be required to provide a user name and password. To generate higher level access objects, the user may be required to provide more secure credential data such as a digital certificate, multi-factor authentication result, etc.

The resource system may also determine if the credential data is valid. This may be done in any suitable manner including, for example, by comparing the credential data to reference credential data for the user, by verifying a cryptographic signature on a digital certificate or other data, etc. If the credential data is valid, the resource system may proceed. If the credential data is not valid, the resource system may not generate the requested access object. In some examples, credential data may be validated by one or more reference functions. For example, the credential data may be broken into a first segment and a second segment. A first function may be applied to the first segment and a second function may be applied to the second segment. In some examples, the functions and the segmentation of the credential data may be selected such that the results of the two functions are equal. Although receiving the access request and credential data are shown in the process flow 400 as a single action, in some examples, these may be separated into multiple actions. For example, upon receiving the access request, the resource system may prompt the user to provide the credential data.

At action 404, the resource system may determine secondary data. Secondary data may be determined in any suitable manner In some examples, the credential data may be or include the secondary data. In some examples, the resource system may query a user computing device 108 to receive the secondary data. For example, secondary data may be stored in clear and/or encrypted form on the user computing device 108. Also, as described herein, the resource system may receive secondary data from a third system such as 106 or 306. For example, the user may authenticate to the third system and, in response, the third system may provide some or all of the secondary data to the resource system.

At action 406, the resource system may generate an access object from the secondary data. In some examples, the access object may be generated by combining the secondary data with an object fragment, such as 114B. Any suitable method for combination may be used. In some examples, an object fragment may include source code including one or more placeholder strings. In another example, the secondary data may include a decryption key necessary for decrypting a software computing asset. The resource system 102 may incorporate the decryption key into the object fragment to create an access object capable of decrypting, and thereby applying one or more functions, to computing resources. In some examples, object fragments stored at the resource system may be omitted. For example, the resource system may be programmed to generate an access object from combining all or parts of data units from the secondary data. In other examples, as described below, the access object may be reassembled from disassembled data. In some examples, an object fragment may be or comprise a partial universal resource locator (URL), for example, including a placeholder string. The resource system 102 may generate an access object by incorporating a replacement string to replace the placeholder string. Executing the access object may be or include accessing the resource at the indicated URL.

At action 408, the resource system may provide computing resource functions to the user. The access object generated at action 406 may enable the computing resource functions. In some examples, when executed by the resource system, an access object may directly perform one or more computing resource functions. In some examples, the access object, when executed by the resource system, may cause the resource system to provide the user with a UI page, such as those described herein, to allow the user to select computing resource functions to be performed. In other examples, the access object, when executed by the resource system, may provide the user computing device with access to an application programming interface (API), allowing the user computing device to request one or more functions with respect to one or more computing device resources.

At action 410, the resource system (e.g., the previously generated access object) may determine if the user has requested additional access to computing resources. In some examples, such as request may also be accompanied by next level credential data. If such a request is received (and the next level credential data is validated), the resource system (e.g., the previously generated access object) may proceed to action 404 and generate a next level access object.

At action 412, the resource system may determine whether to terminate the access object generated at action 406. For example, the access object may be terminated if the user requests it, for example, by selecting a close button on a UI page as described herein. Also, in some examples, the resource system may terminate the access object if a threshold use period has passed since it was generated, if a threshold timeout period has passed since the user 104 last utilized the access object to access computing resources, etc. If the access object is not to be terminated, the resource system may continue to provide the user with access to computing resource functions at action 408. If the access object is to be terminated, the resource system 102 may terminate the access object at action 414. Terminating the access object may include, for example, terminating any active threads of the access object that are executing at the resource system or other system and deleting the access object from volatile memory. In some examples, terminating the access object may comprise terminating execution of the access object, which may cause the resource system 102 to remove the code for executing the access object from non-volatile memory.

Figure 5:
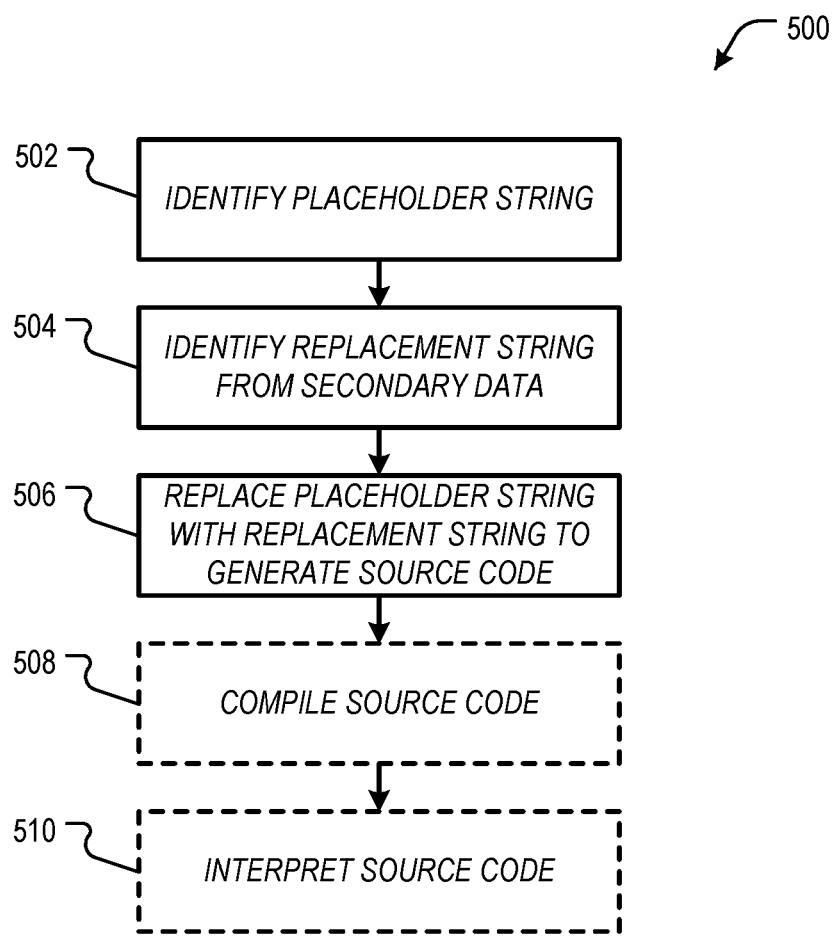
FIG. 5 is a flowchart showing one example of a process flow that may be executed by the resource system (e.g., a previously-generated access object) to generate a new access object.

FIG. 5 is a flowchart showing one example of a process flow 500 that may be executed by the resource system (e.g., a previously-generated access object) to generate a new access object. The process flow 500 illustrates an example where the new access object is generated at the source code level from an object fragment and secondary data. At action 502, the resource system may identify one or more placeholder strings in the object fragment. A placeholder string may be a line of characters in the object fragment source code that is not functional and is to be replaced by a replacement string from the secondary data. For example, an object fragment may include the following source code identifying a list of file computing resources that can be accessed:

filelist=PLACEHOLDER

Here, the placeholder string is "PLACEHOLDER." An object fragment may include one placeholder string, or multiple placeholder strings.

At action 504, the resource system may identify one or more replacement strings from the secondary data. At action 506, the resource system may replace the placeholder string with the identified replacement string or strings from the secondary data. Referring to the example above, a replacement string replacing the placeholder string "PLACEHOLDER" may identify a specific list of files that can be accessed with the to-be-generated access object:

filelist=File A; File B; File C . . . ; File N

In this example, the replacement string is "File A; File B; File C . . . ; File N." In some examples, either the object fragment or the secondary data may include a table or other data structure that relates replacements strings to corresponding placeholder strings. Also, in some examples, a placeholder string may include a pointer or other reference to a location in secondary data including the appropriate replacement string.

Optionally, at action 508, the resource system may compile the source code generated at action 506. For example, if the source code is according to a compiled programming language such as Java™, C++, etc., the resource system may compile it to generate object code that may be executed to execute the generated access object. Optionally, at action 510, the resource system may interpret the source code generated at action 506. For example, if the source code is according to an interpreted programming language such as JavaScript, PHP, etc., it may be interpreted, for example, at runtime. In some examples, the source code generated at action 506 may be interpreted utilizing a string evaluation function, such as the "eval" function available in PHP. For example, the "eval" function may be called with the source code generated at action 506 as an argument.

Figure 6:
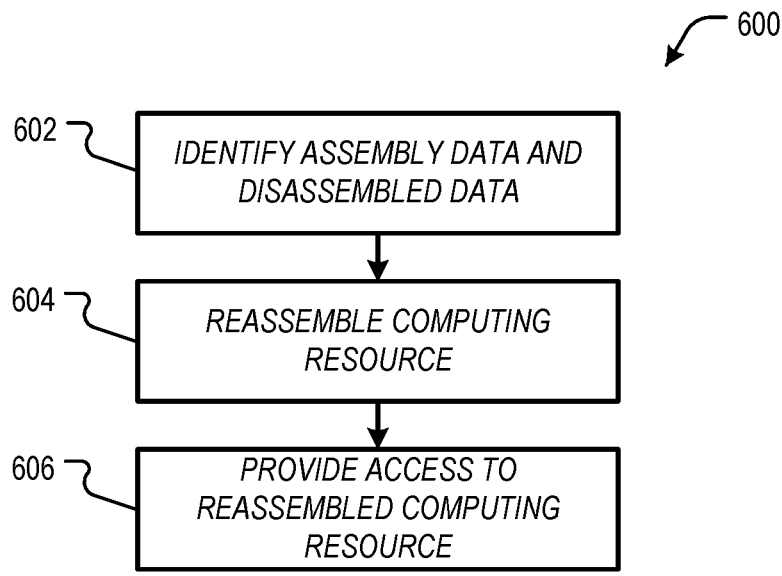
FIG. 6 is a flowchart showing one example of a process flow that may be executed by an access object to reassemble a data resource.

In some examples, computing resources may be stored at the resource system or other system or systems in disassembled form. That is, for example, a data resource may not exist on the resource system or any other system as a single integrated file or unit. Instead, the data resource may exist in scrambled for across one or many units of disassembled data. An access object may include functionality to reassemble the data resource. For example, FIG. 6 is a flowchart showing one example of a process flow 600 that may be executed by an access object to reassemble a data resource. At action 602, the access object may identify assembly data and disassembled data. (When the disassembly and assembly techniques described below are used, a remnant array, as described, may also be identified and used.) Disassembled data may include fragments of the data resources for reassembly. The assembly data may include data describing how the disassembled data can be reassembled to generate the data resource. At action 604, the access object may reassemble the data resource, for example, by applying the assembly data to unscramble and/or join the disassembled data (e.g., along with a remnant array). At action 606, the access object may provide the user with access to the reassembled data.

Figure 7:
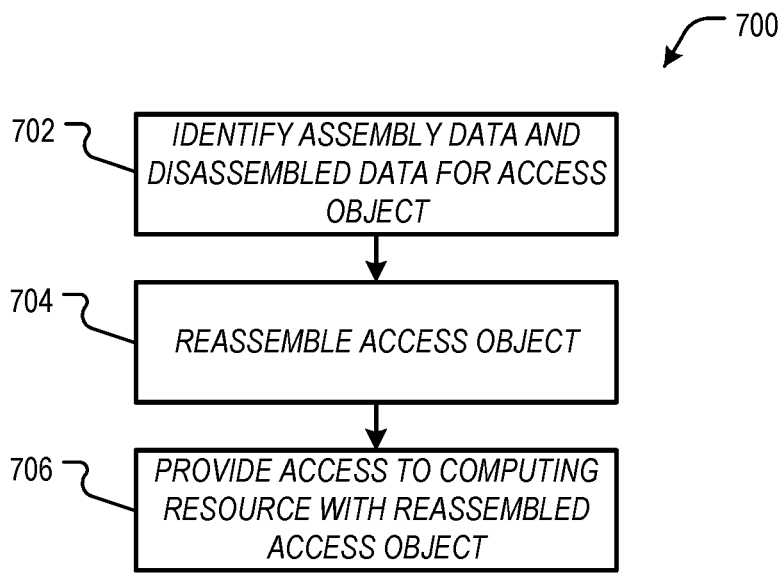
FIG. 7 is a flowchart showing one example of a process flow that may be executed by the resource system (e.g., a previously-generated access object at the resource system) to assemble a new access object.

In some examples, access objects may also be disassembled. For example, generating an access object may include reassembling the access object from a disassembled form. Access objects, in some examples, may be disassembled and/or reassembled in source code or object code form. FIG. 7 is a flowchart showing one example of a process flow 700 that may be executed by the resource system (e.g., a previously-generated access object at the resource system) to assemble a new access object. At action 702, the resource system may identify assembly data and disassembled data for the access object. (When the disassembly and assembly techniques described below are used, a remnant array, as described, may also be identified and used.) The assembly data and disassembled data may be found, for example, in secondary data (as described herein) and/or at one or more object fragments. In some examples, the object fragment may be or include disassembled data and the secondary data may include the assembly data, though any suitable arrangement may be used. At action 704, the resource system may reassemble the access object utilizing the disassembled data and the assembly data (e.g., along with a remnant array). At action 706, the reassembled access object may provide access to computing resources, for example, as described herein.

A data resource or access object may be disassembled and reassembled in any suitable manner. Example systems and methods for disassembling data resources is provided in co-owned U.S. patent application Ser. No. 14/574,039 entitled "DATA SECURITY UTILIZING DISASSEMBLED DATA STRUCTURES," filed on Dec. 17, 2014 and incorporated by reference herein in its entirety.

Figure 8:
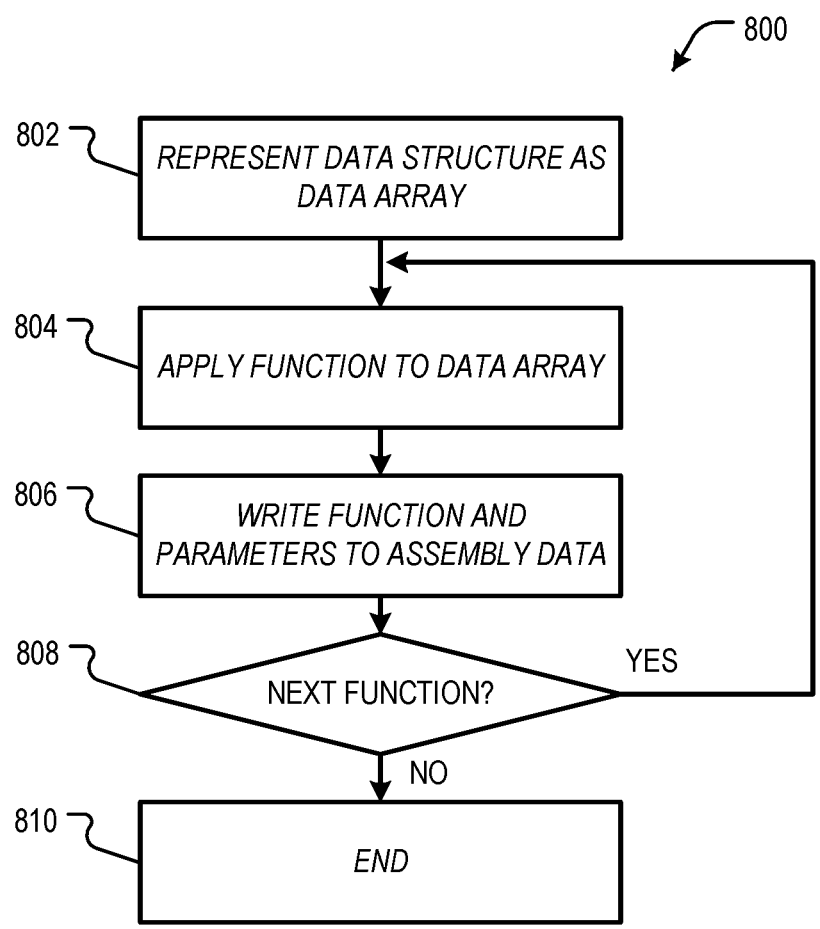
FIG. 8 is a flowchart showing one example of a process flow that may be executed by a data disassembler to disassemble a data structure, such as a data resource or access object.

FIG. 8 is a flowchart showing one example of a process flow 800 that may be executed by a data disassembler to disassemble a data structure, such as a data resource or access object. The process flow 800 may be executed by any suitable data disassembler such as, for example, a resource system. At action 802, the data disassembler may represent a data structure (e.g., an assembled data resource or access object) as a multi-dimensional array. For example, the data structure may include data units (e.g., bytes, bits, file system data blocks, etc.) each data unit each data unit making up the data structure may be described by a unique coordinate set. Coordinate sets may be represented according to any suitable coordinate format including, for example, rectangular or Cartesian coordinates, polar coordinates, cylindrical coordinates, spherical coordinates, etc. If the data structure is received in a format that is already expressed as a multi-dimensional array, action 802 may be omitted. The multi-dimensional array may be a two-dimensional rectangular array in which the data units of the data structure are described by a set of two (2) coordinates. In rectangular format, the coordinates for each data unit in the multi-dimensional array may be described as (i) a position on a horizontal or x-axis; and (ii) a position on a vertical or y-axis. Of course, in some examples, the multi-dimensional array may include more than two dimensions.

At action 804, the data disassembler may apply a first function from an ordered set of functions to the data array 3. The function may be any type of function that takes one or more input parameters or function parameters and provides as output an ordered series of coordinate sets. Function parameters for a function may include, for example, an offset or offsets for the function, a range over which the function is to be applied, coefficients or other function variations, etc. Data units from the multi-dimensional array at the positions of the ordered series of coordinate sets may be written in order to disassembled data. At the multi-dimensional array, the previous location of moved data units may be left blank or filled with a replacement data (e.g., a null indicator, a predetermined value, etc.). The disassembled data may comprise any one or more logical data containers such as, for example, one or more files, one or more sub-files, one or more directories, etc.

At action 806, the data disassembler may write the first function and its function parameters to assembly data, which may comprise an ordered list of functions and function parameters used in the disassembly. In this way, the data disassembler may create a record of the functions applied to the multi-dimensional array, the function parameters used, and the order in which the functions were applied. The assembly data may be used in conjunction with the disassembled data and the remnant array of the data array to reassemble the data structure, as described herein. The assembly data may comprise any one or more logical data containers such as, for example, one or more files, one or more sub-files, one or more directories, etc. In examples where the ordered set of functions and associated function parameters is created before data disassembly, action 806 may be omitted. At action 808, the data disassembler may determine whether there is a next function in the ordered set of functions that has yet to be applied to the data structure. The next function may be a function immediately after the first function according to the ordered set of functions. If there is no next function, the data disassembler may conclude at action 810. If there is a next function, the data disassembler may return to action 804 and apply the next function as described.

In some examples, the data disassembler may generate the ordered set of functions during the disassembly process. Accordingly, determining whether there is a next function may comprise determining whether a threshold number of functions have been applied to the multi-dimensional array. If the threshold has been met, then the data disassembler may conclude. If the threshold has not been met, then the data disassembler may select a next function in any suitable manner For example, the data disassembler may randomly select the next function from a prepopulated list of functions.

Figure 9:
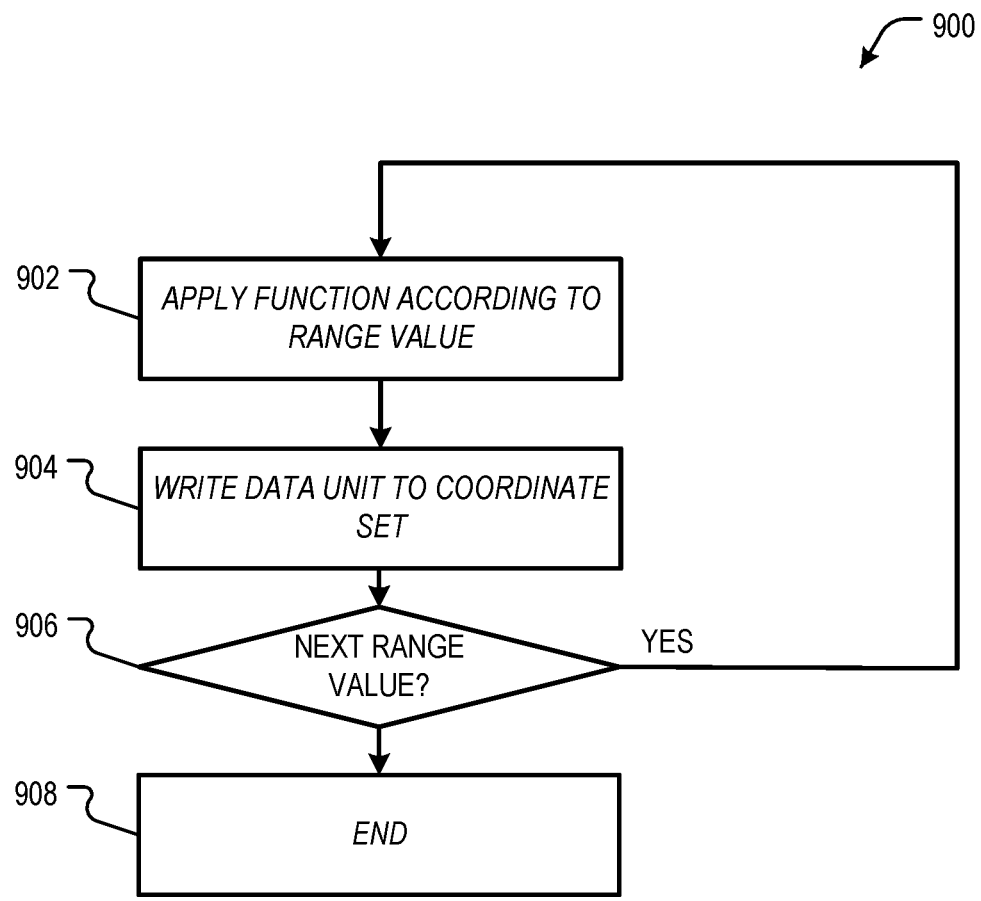
FIG. 9 is a flowchart showing one example of a process flow that may be executed by the data disassembler to apply a function to the multi-dimensional array, for example, as described at action.

FIG. 9 is a flowchart showing one example of a process flow 900 that may be executed by the data disassembler to apply a function to the multi-dimensional array. For example, the process flow 900 shows one example way that the data disassembler may apply a function to the multi-dimensional array, as described above with respect to action 804. At action 902, the data disassembler may apply a function according to a first range value. As described herein, each function may be applied with function parameters that include a range over which the function is to be applied to the multi-dimensional array. The range may be expressed in any suitable form. For example, when the function is a parametric equation, the range may be expressed as an ordered set of values for the parameter. Also, in some examples, the range may be expressed as an ordered set of values along one or more of the coordinate axes of the multi-dimensional array.

The first range value, applied to the function, may provide a set of coordinates from the multi-dimensional array. At action 904, the data disassembler may write the data unit at the provided coordinates to the disassembled data. Data units may be written to the disassembled data in order. For example, at action 904, the data unit may be written to the disassembled data at a position immediately after a position of the previous data unit written to the disassembled data. The data disassembler may replace the data unit in the multi-dimensional array with replacement data, for example, as described above. At action 906, the data disassembler may determine whether there is a next range value for the function (e.g., whether the data disassembler has already applied the function over the entirety of the indicated range). If there is a next range value, the data disassembler may return to action 902 and apply the function according to the next range value. If there is no next range value for the function, application of the function may be completed at action 908.

Figure 10:
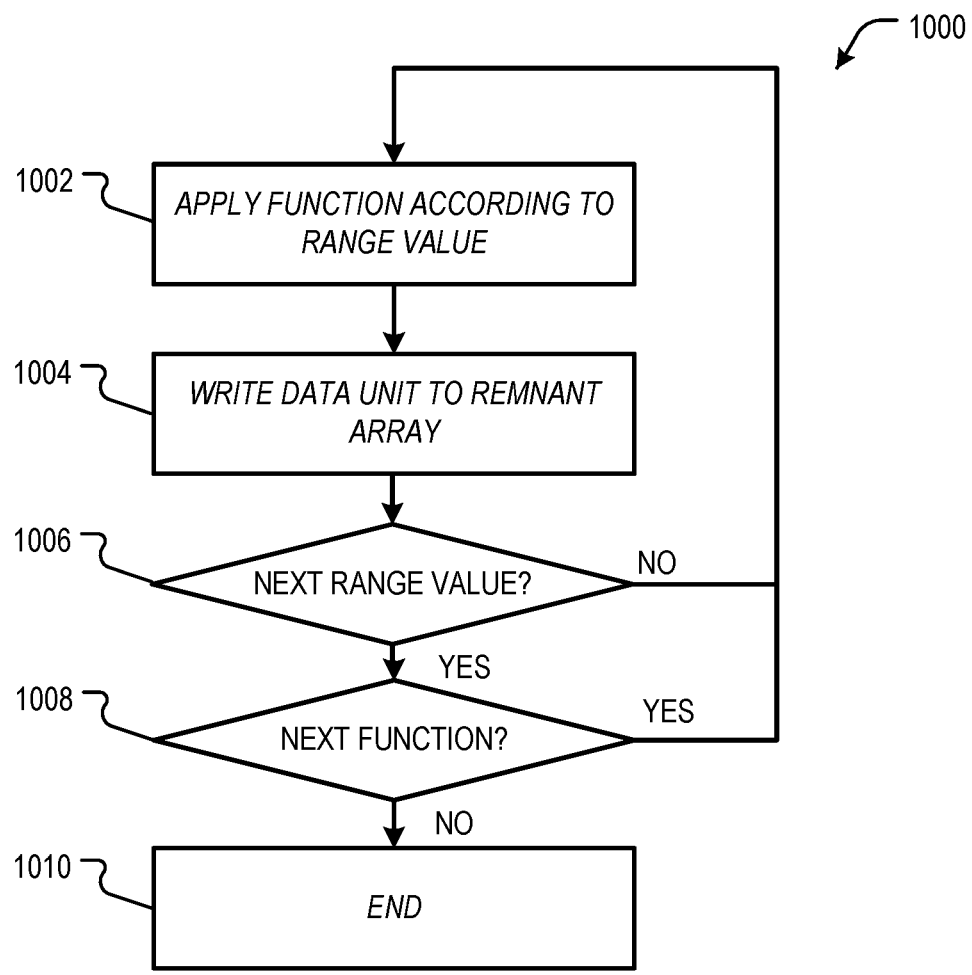
FIG. 10 is a flow chart showing one example of a process flow for reassembling a disassembled data structure, such as a data resource or an access object.

FIG. 10 is a flow chart showing one example of a process flow 1000 for reassembling a disassembled data structure, such as a data resource or an access object. For example, FIG. 10 shows one example way that actions 604 and 704 above may be performed. The process flow 1000 may be executed by any suitable data assembler device such as the resource system and/or a previously-generated access object. At 1002, the data assembler may apply a function to disassembled data and a remnant array according to a range value. The function may be selected, for example, by applying an ordered set of functions from assembly data in reverse order. For example, the first function applied to assemble the data structure may be the last function that was applied to disassemble it. Functions applied to assemble data may be applied utilizing the same function parameters that were utilized during disassembly. Values for the function range, however, may also be applied in reverse order. For example, the last range value for the function applied during disassembly may be the first range value for the function applied during assembly; the next-to-last range value for the function applied during disassembly may be the second range value for the function applied during disassembly, and so on. For example, if a circle function is applied during disassembly with a range of values in order from 0 to $2\pi$, the same range may be used during assembly in order from $2\pi$ to 0.

For each value in the function range, the function may produce a coordinate set. At action 1004, the data assembler may pull a next data unit from the disassembled data and write it to the determined location at the remnant array. Data units may be selected from the disassembled data in the reverse of the order in which they were written. For example, the last data unit written to the disassembled data may be the first written back to the remnant array, the next-to-last data unit written to the disassembled data 4 may be the second written back to the remnant array and so on. In this way, the assembler may reverse the operation of the disassembler by writing data units from the disassembled data back to their original location in the remnant array.

At action 1006, the data assembler may determine whether there is a next range value for the function. For example, the data assembler may determine whether it has already applied the complete range for the function. If not, then data assembler may return to action 1002 and apply the function according to the next range value. If all range values for the function have been applied, the data assembler may determine, at action 1008, whether there is a next function to be applied. For example, the data assembler may determine whether all of the functions applied during disassembly have been applied during assembly. If not, then the data assembler may iterate to the next function to be considered and return to action 1002 and apply the next function according to its next value range. For example, the data assembler may continue to proceed backwards through the ordered set of functions applied during disassembly. If no functions remain to be applied, then the remnant array may comprise all of the data from the original data structure (e.g., data resource or access object) in its original order. Accordingly, the process may end at action 1010.

Figure 11:
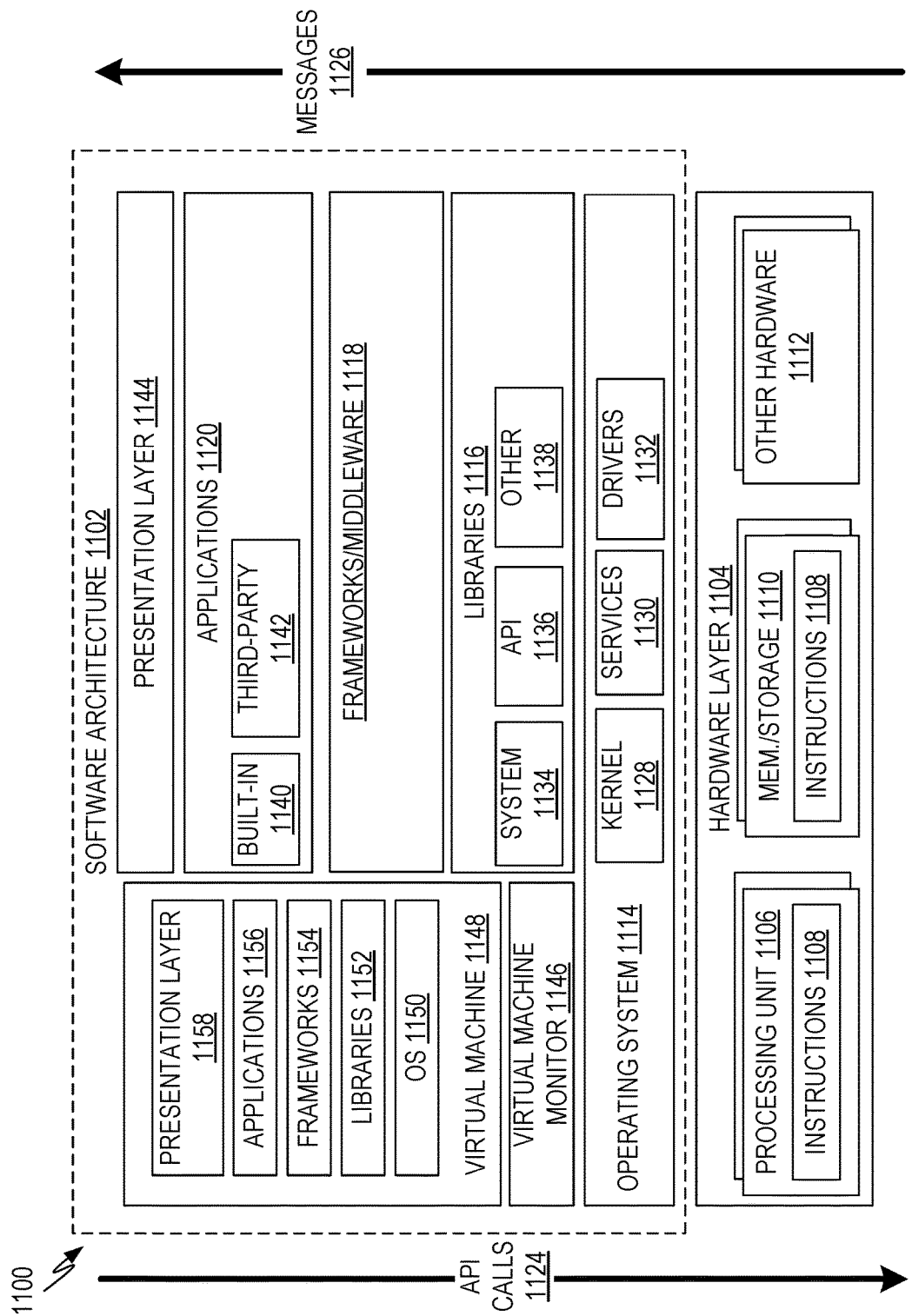
FIG. 11 is a block diagram showing one example of a software architecture for a computing device.

FIG. 11 is a block diagram 1100 showing one example of a software architecture 1102 for a computing device. The architecture 1102 maybe used in conjunction with various hardware architectures, for example, as described herein. For example, the architecture 1102 may describe the resource system 102, the third system 106, the user computing device 108 and/or any other suitable computing system described herein. FIG. 11 is merely a non-limiting example of a software architecture and many other architectures may be implemented to facilitate the functionality described herein. A representative hardware layer 1104 is illustrated and may represent, for example, any of the above referenced computing devices. In some examples, the hardware layer 1104 may be implemented according to the architecture 1200 of FIG. 12.

The representative hardware layer 1104 comprises one or more processing units 1106 having associated executable instructions 1108. Executable instructions 1108 represent the executable instructions of the software architecture 1102, including implementation of the methods, modules, components, and so forth of FIGS. 1-10. Hardware layer 1104 also includes memory and/or storage modules 1110, which also have executable instructions 1108. Hardware layer 1104 may also comprise other hardware as indicated by 1112 which represents any other hardware of the hardware layer 1104, such as the other hardware illustrated as part of hardware architecture 1200.

In the example architecture of FIG. 11, the software 1102 may be conceptualized as a stack of layers where each layer provides particular functionality For example, the software 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third party applications 1142. Examples of representative built-in applications 1140 may include, but are not limited to, a contacts application, a browser application, a book reader application, a location application, a media application, a messaging application, and/or a game application. Third party applications 1142 may include any of the built in applications as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" may be separated from the aspects of the application/module that interact with a user.

Some software architectures utilize virtual machines. In the example of FIG. 11, this is illustrated by virtual machine 1148. A virtual machine creates a software environment where applications/modules may execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 may be the same as corresponding layers previously described or may be different.

Figure 12:
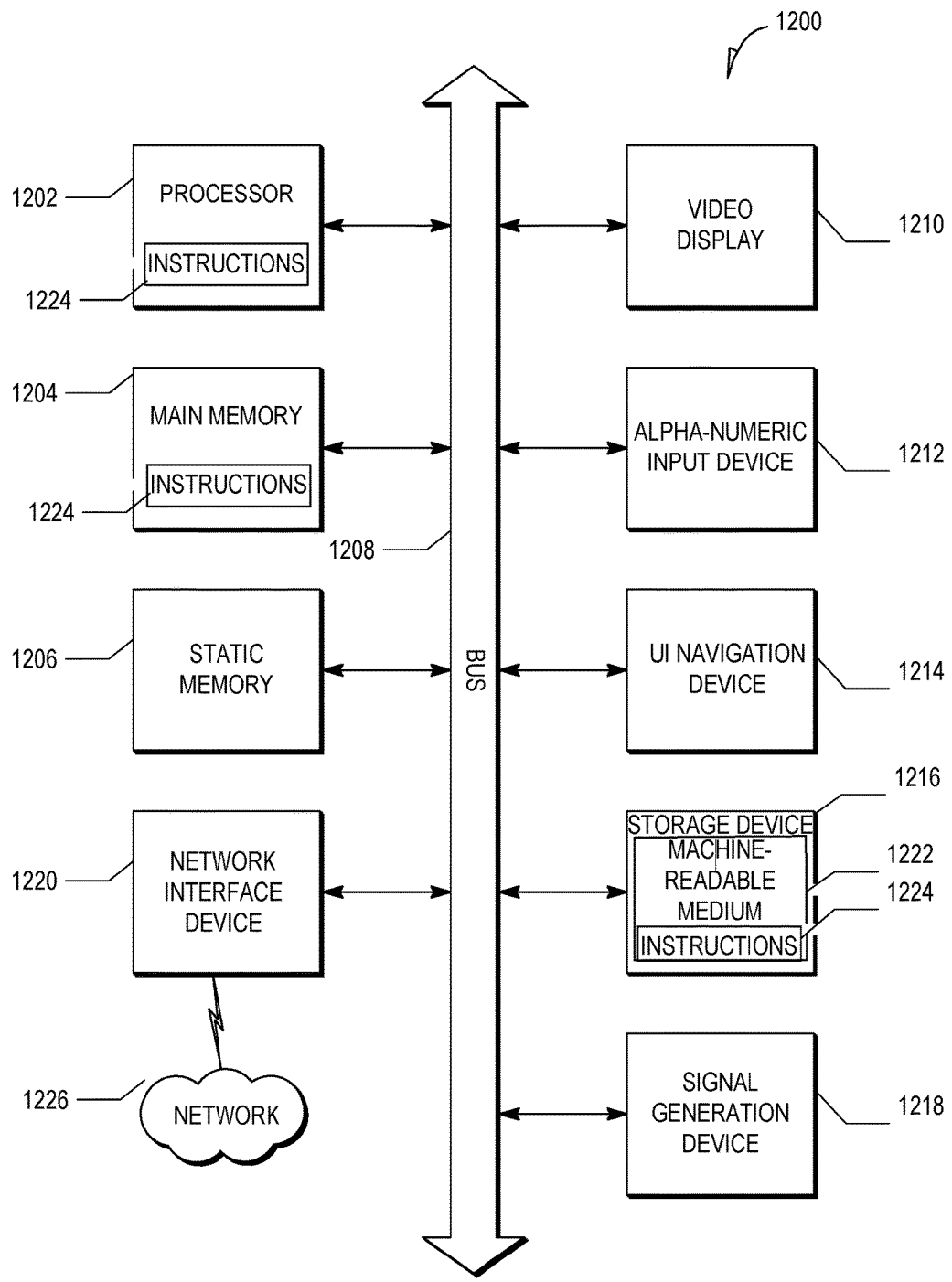
FIG. 12 is a block diagram illustrating a computing device hardware architecture, within which a set or sequence of instructions may be executed to cause the machine to perform examples of any one of the methodologies discussed herein.

FIG. 12 is a block diagram illustrating a computing device hardware architecture 1200, within which a set or sequence of instructions may be executed to cause the machine to perform examples of any one of the methodologies discussed herein. For example, the architecture 1200 may execute the software architecture 1102 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 may be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine.

Example architecture 1200 includes a processor unit 1202 comprising at least one processor (e.g., a central processing unit (CPU), a graphics processing unit (GPU) or both, processor cores, compute nodes, etc.). The architecture 1200 may further comprise a main memory 1204 and a static memory 1206, which communicate with each other via a link 1208 (e.g., bus). The architecture 1200 may further include a video display unit 1210, an alphanumeric input device 1212 (e.g., a keyboard), and a user interface (UI) navigation device 1214 (e.g., a mouse). In some examples, the video display unit 1210, input device 1212 and UI navigation device 1214 are incorporated into a touch screen display. The architecture 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the architecture 1200, with the main memory 1204, static memory 1206, and the processor 1202 also constituting machine-readable media. Instructions stored at the machine-readable medium 1222 may include, for example, instructions for implementing the software architecture 1102, instructions for executing any of the features described herein, etc.

While the machine-readable medium 1222 is illustrated in an example to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of components, engines, or modules, circuits, which for the sake of consistency are termed circuits, although it will be understood that these terms may be used interchangeably. Circuits may be hardware, software, or firmware communicatively coupled to one or more processors in order to carry out the operations described herein. Circuits may be hardware circuits, and as such circuits may be considered tangible entities capable of performing specified operations and may be configured or arranged in a certain manner In an example, circuits may be arranged (e.g., internally or with respect to external entities such as other circuits) in a specified manner as a circuit. In an example, the whole or part of one or more computing platforms (e.g., a standalone, client or server computing platform) or one or more hardware processors may be configured by firmware or software (e.g., instructions, an application portion, or an application) as a circuit that operates to perform specified operations. In an example, the software may reside on a machine-readable medium. In an example, the software, when executed by the underlying hardware of the circuit, causes the hardware to perform the specified operations. Accordingly, the term hardware circuit is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which circuits are temporarily configured, each of the circuits need not be instantiated at any one moment in time. For example, where the circuits comprise a general-purpose hardware processor configured using software; the general-purpose hardware processor may be configured as respective different circuits at different times. Software may accordingly configure a hardware processor, for example, to constitute a particular circuit at one instance of time and to constitute a different circuit at a different instance of time.

ADDITIONAL NOTES & EXAMPLES

Example 1 is a method for providing access to computing resources, comprising: receiving, by a resource system, an access request from a first user, wherein the access request comprises resource data describing a computing resource, and function data describing a requested function to be performed on the computing resource, wherein the resource system comprises at least one processor and memory in communication with the at least one processor; determining, by the resource system, that credential data provided by the first user is valid; identifying, by the resource system, secondary data for the access request; generating, by the resource system, an access object based at least in part on access object fragment data and the secondary data; and executing the access object, by the resource system, to enable performance of the requested function on the computing resource.

In Example 2, the subject matter of Example 1 optionally includes wherein the access request is received via a first user computing device, and wherein identifying the secondary data comprises querying the first user computing device.

In Example 3, the subject matter of any one or more of Examples 1-2 optionally include wherein the access request also includes the secondary data.

In Example 4, the subject matter of any one or more of Examples 1-3 optionally include wherein the secondary data comprises a replacement string, and wherein generating the access object comprises: identifying in the access object fragment data a placeholder string; replacing the placeholder string with the replacement string to generate source code for the access object; and generating object code for the access object based at least in part on the source code for the access object.

In Example 5, the subject matter of Example 4 optionally includes wherein the replacement string includes text describing a plurality of data files to be readable by the first user, and wherein executing the access object to perform the requested function on the computing resource comprises reading a first data file of the plurality of data files.

In Example 6, the subject matter of any one or more of Examples 1-5 optionally include wherein the secondary data comprises a decryption key, and wherein executing the access object to perform the requested function on the computing resource comprises decrypting the computing resource based at least in part on the decryption key.

In Example 7, the subject matter of any one or more of Examples 1-6 optionally include generating a user interface page comprising an indication of the computing resource and a selectable indication of the requested function; and before executing the access object to perform the requested function on the computing resource, determining that the first user has selected the selectable indication of the requested function.

In Example 8, the subject matter of any one or more of Examples 1-7 optionally include receiving a second resource access request from the first user, the second resource access request comprising second credential data for the first user; determining that the second credential data is valid; identifying second secondary data for the second resource access request; and executing the access object to generate a second access object based at least in part on second access object fragment data and the second secondary data.

In Example 9, the subject matter of Example 8 optionally includes wherein the second resource access request also comprises second function data describing a second requested function to be performed on the computing resource, further comprising executing the second access object to perform the second requested function on the computing resource.

In Example 10, the subject matter of any one or more of Examples 8-9 optionally include wherein the second resource access request also comprises second resource data describing a second computing resource, further comprising executing the second access object to act upon the second computing resource.

In Example 11, the subject matter of any one or more of Examples 8-10 optionally include executing the access object to generate a user interface comprising a credential field; and receiving the second secondary data via the credential field.

In Example 12, the subject matter of any one or more of Examples 1-11 optionally include receiving the secondary data from a third computing system.

Example 13 is a system for securing computing resources comprising: a computing device comprising at least one processor and a memory in communication with the at least one processor, wherein the computing device is programmed to: receive an access request from a first user, wherein the access request comprises resource data describing a computing resource, function data describing a requested function to be performed on the computing resource; determine that credential data provided by the first user is valid; determine secondary data for the access request; generate an access object based at least in part on access object fragment data and the secondary data; and execute the access object to enable performance of the requested function on the computing resource.

In Example 14, the subject matter of Example 13 optionally includes wherein the access request is received via a first user computing device, and wherein identifying the secondary data comprises querying the first user computing device.

In Example 15, the subject matter of any one or more of Examples 13-14 optionally include wherein the access request also includes the secondary data.

In Example 16, the subject matter of any one or more of Examples 13-15 optionally include wherein the secondary data comprises a replacement string, and wherein generating the access object comprises: identifying in the access object fragment a placeholder string; replacing the placeholder string with the replacement string to generate source code for the access object; and generating object code for the access object based at least in part on the source code for the access object.

In Example 17, the subject matter of Example 16 optionally includes wherein the replacement string includes text describing a plurality of data files to be readable by the first user, and wherein executing the access object to perform the requested function on the computing resource comprises reading a first data file of the plurality of data files.

In Example 18, the subject matter of any one or more of Examples 13-17 optionally include wherein the secondary data comprises a decryption key, and wherein executing the access object to perform the requested function on the computing resource comprises decrypting the computing resource based at least in part on the decryption key.

In Example 19, the subject matter of any one or more of Examples 13-18 optionally include wherein the computing device is further programmed to: generate a user interface page comprising an indication of the computing resource and a selectable indication of the requested function; and before executing the access object to perform the requested function on the computing resource, determine that the first user has selected the selectable indication of the requested function.

In Example 20, the subject matter of any one or more of Examples 13-19 optionally include wherein the computing device is further programmed to: receive a second resource access request from the first user, the second resource access request comprising second credential data for the first user; determine that the second credential data is valid; identify second secondary data for the second resource access request; and execute the access object to generate a second access object based at least in part on second access object fragment data and the second secondary data.

In Example 21, the subject matter of Example 20 optionally includes executing the access object to generate a user interface comprising a credential field; and receiving the second secondary data via the credential field.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A method for providing access to computing resources, comprising:
    receiving, by a resource system, an access request from a first user, wherein the access request comprises resource data describing a computing resource, and function data describing a requested function to be performed on the computing resource, wherein the resource system comprises at least one processor and memory in communication with the at least one processor;
    determining, by the resource system, that credential data provided by the first user is valid;
    identifying, by the resource system, secondary data for the access request;
    generating, by the resource system, an access object based at least in part on access object fragment data and the secondary data, the access object comprising executable code; and
    executing the access object, by the resource system, to enable performance of the requested function on the computing resource, wherein executing the access object comprises executing at least a portion of the executable code.

2. The method of claim 1, wherein the access request is received via a first user computing device, and wherein identifying the secondary data comprises querying the first user computing device.

3. The method of claim 1, wherein the access request also includes the secondary data.

4. The method of claim 1, wherein the secondary data comprises a replacement string, and wherein generating the access object comprises:
    identifying in the access object fragment data a placeholder string;
    replacing the placeholder string with the replacement string to generate source code for the access object; and
    generating object code for the access object based at least in part on the source code for the access object.

5. The method of claim 4, wherein the replacement string includes text describing a plurality of data files to be readable by the first user, and wherein executing the access object to perform the requested function on the computing resource comprises reading a first data file of the plurality of data files.

6. The method of claim 1, wherein the secondary data comprises a decryption key, and wherein executing the access object to perform the requested function on the computing resource comprises decrypting the computing resource based at least in part on the decryption key.

7. The method of claim 1, further comprising:
    generating a user interface page comprising an indication of the computing resource and a selectable indication of the requested function; and
    before executing the access object to perform the requested function on the computing resource, determining that the first user has selected the selectable indication of the requested function.

8. The method of claim 1, further comprising:
    receiving a second resource access request from the first user, the second resource access request comprising second credential data for the first user;
    determining that the second credential data is valid;
    identifying second secondary data for the second resource access request; and
    executing the access object to generate a second access object based at least in part on second access object fragment data and the second secondary data.

9. The method of claim 8, wherein the second resource access request also comprises second function data describing a second requested function to be performed on the computing resource, further comprising executing the second access object to perform the second requested function on the computing resource.

10. The method of claim 8, wherein the second resource access request also comprises second resource data describing a second computing resource, further comprising executing the second access object to act upon the second computing resource.

11. The method of claim 8, further comprising:
    executing the access object to generate a user interface comprising a credential field; and
    receiving the second secondary data via the credential field.

12. The method of claim 1, further comprising receiving the secondary data from a third computing system.

13. A system for securing computing resources comprising:
    a computing device comprising at least one processor and a memory in communication with the at least one processor, wherein the computing device is programmed to:
        receive an access request from a first user, wherein the access request comprises resource data describing a computing resource, function data describing a requested function to be performed on the computing resource;

determine that credential data provided by the first user is valid;

determine secondary data for the access request;

generate an access object based at least in part on access object fragment data and the secondary data, the access object comprising executable code; and execute the access object to enable performance of the requested function on the computing resource, wherein executing the access object comprises executing at least a portion of the executable code.

14. The system of claim 13, wherein the access request is received via a first user computing device, and wherein identifying the secondary data comprises querying the first user computing device.

15. The system of claim 13, wherein the access request also includes the secondary data.

16. The system of claim 13, wherein the secondary data comprises a replacement string, and wherein generating the access object comprises:

identifying in the access object fragment data a placeholder string;

replacing the placeholder string with the replacement string to generate source code for the access object; and generating object code for the access object based at least in part on the source code for the access object.

17. The system of claim 16, wherein the replacement string includes text describing a plurality of data files to be readable by the first user, and wherein executing the access object to perform the requested function on the computing resource comprises reading a first data file of the plurality of data files.

18. The system of claim 13, wherein the secondary data comprises a decryption key, and wherein executing the access object to perform the requested function on the computing resource comprises decrypting the computing resource based at least in part on the decryption key.

19. The system of claim 13, wherein the computing device is further programmed to:

generate a user interface page comprising an indication of the computing resource and a selectable indication of the requested function; and before executing the access object to perform the requested function on the computing resource, determine that the first user has selected the selectable indication of the requested function.

20. The system of claim 13, wherein the computing device is further programmed to:

receive a second resource access request from the first user, the second resource access request comprising second credential data for the first user;

determine that the second credential data is valid;

identify second secondary data for the second resource access request; and execute the access object to generate a second access object based at least in part on second access object fragment data and the second secondary data.

21. The system of claim 20, further comprising:

executing the access object to generate a user interface comprising a credential field; and receiving the second secondary data via the credential field.

* * * * *